US012601869B2

(12) United States Patent
Chang et al.

(10) Patent No.: US 12,601,869 B2
(45) Date of Patent: Apr. 14, 2026

(54) BACKLIGHT MODULE AND DISPLAY DEVICE

(71) Applicant: Radiant Opto-Electronics Corporation, Kaohsiung (TW)

(72) Inventors: Chia-Yin Chang, Kaohsiung (TW); Po-Chang Huang, Kaohsiung (TW); Kun-Cheng Lin, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 19/081,493

(22) Filed: Mar. 17, 2025

(65) Prior Publication Data

US 2026/0093066 A1     Apr. 2, 2026

Related U.S. Application Data

(63) Continuation of application No. PCT/CN2024/123043, filed on Sep. 30, 2024.

(30) Foreign Application Priority Data

Sep. 30, 2024     (WO) ................ PCT/CN2024/123043

(51) Int. Cl.
*F21V 8/00*          (2006.01)
(52) U.S. Cl.
CPC ......... *G02B 6/0053* (2013.01); *G02B 6/0051* (2013.01)
(58) Field of Classification Search
CPC .......................... G02B 6/0051; G02B 6/0053
See application file for complete search history.

(56) References Cited

U.S. PATENT DOCUMENTS

| | | | | |
|---|---|---|---|---|
| 11,029,462 B2 * | 6/2021 | Chen | .................... | G02B 6/0038 |
| 11,828,974 B2 * | 11/2023 | Lai | ........................ | G02B 6/0056 |
| 12,099,230 B2 * | 9/2024 | Su | ........................ | G02B 6/0068 |
| 2006/0146566 A1 | 7/2006 | Ko et al. | | |
| 2020/0363039 A1 * | 11/2020 | Chu | ........................ | F21V 3/049 |
| 2021/0286214 A1 * | 9/2021 | Chen | .................... | G02B 6/0051 |
| 2023/0288609 A1 | 9/2023 | Sirbuly et al. | | |

FOREIGN PATENT DOCUMENTS

| | | |
|---|---|---|
| CN | 101171533 A | 4/2008 |
| CN | 101393285 A | 3/2009 |
| CN | 101458347 A | 6/2009 |
| CN | 105022107 A | 11/2015 |
| CN | 109752781 A | 5/2019 |
| CN | 112014918 A | 12/2020 |
| CN | 212624628 U | 2/2021 |

(Continued)

*Primary Examiner* — Eric T Eide

(57) ABSTRACT

A backlight module comprises a light guide plate, a light source, a first optical film, and two second optical films. The first optical film is positioned toward the light emitting surface of the light guide plate and includes a body with multiple parallel prisms extending towards the light emitting surface and multiple optical structures positioned on the body and facing away from the light guide plate. Each of the second optical films has multiple parallel strips facing away from the first optical film. The direction of the strips on one of the second optical films being different from that on the other second optical film. This invention also provides a display device with the backlight module.

22 Claims, 19 Drawing Sheets

(56)         References Cited

FOREIGN PATENT DOCUMENTS

| | | | |
|----|----------|----|---------|
| CN | 215986821 | U | 3/2022 |
| CN | 114624799 | A | 6/2022 |
| CN | 217332919 | U | 8/2022 |
| CN | 218383371 | U | 1/2023 |
| CN | 220252346 | U | 12/2023 |
| CN | 221726356 | U | 9/2024 |
| JP | 2011123379 | A | 6/2011 |
| TW | 200540527 | A | 12/2005 |
| TW | M597884 | U | 7/2020 |
| TW | 202043882 | A | 12/2020 |
| TW | M604898 | U | 12/2020 |
| TW | I815497 | B | 9/2023 |
| TW | I817775 | B | 10/2023 |
| WO | 2022250006 | A1 | 12/2022 |

* cited by examiner

1

BACKLIGHT MODULE AND DISPLAY DEVICE

RELATED APPLICATIONS

This application is a continuation application of International Application No. PCT/CN2024/123043, filed on Sep. 30, 2024, which claims priority to China Application Serial Number 202311284181.0, filed on Oct. 7, 2023. The entire disclosures of all the above applications are hereby incorporated by reference.

FIELD OF THE INVENTION

The present invention relates to an optical element, particularly referring to a backlight module and display device capable of enhancing the concentration of light angle and directivity.

BACKGROUND OF THE INVENTION

Conventional backlight modules typically employ diffusion sheets to homogenize light. Common diffusion sheets contain multiple scattering particles that scatter light to disperse it and thereby homogenize the light. However, the diffusion sheets with scattering particles are typically used for light masking and possess a lower optical directivity to disrupt the high directivity of the light guide plate. Improving directivity requires reducing the haze of the diffusion sheet, but this compromises its light masking ability. As for the brightness enhancement film, while it benefits brightness improvement, the haze of the upper and lower diffusion sheets used in the backlight module affects both brightness and optical aesthetic appearance. This results in the difficulty of further increasing the luminance of existing backlight modules. Therefore, the key design focus of backlight modules is how to increase concentration of light angle and directivity while maintaining light masking capability.

SUMMARY OF THE INVENTION

One object of the present invention is to provide a backlight module capable of enhancing the concentration of light angle and directivity.

The backlight module comprises a light guide plate, a light source, a first optical film, and two second optical films stacked on the first optical film. The light guide plate includes a light incident surface and a light emitting surface connected to the light incident surface. The light source is provided corresponding to the light incident surface of the light guide plate. The first optical film is provided corresponding to the light emitting surface of the light guide plate. The first optical film includes a body, a plurality of prisms arranged on the body and facing the light emitting surface, and a plurality of optical structures arranged on the body and facing away from the light emitting surface of the light guide plate. The prisms are located between the light emitting surface and the optical structures. Each of the second optical films has a plurality of parallel strips facing away from the first optical film, and the direction E1 of the strips on one of the second optical films is different from the direction E2 of the strips on the other second optical film.

Another object of the present invention is to provide a display device which comprises the backlight module as described above, and a display panel arranged on the backlight module.

The characteristic of the present invention is that allowing the light emitted from the light source to first pass through the prisms on the first optical film, thereby enhancing directivity. Subsequently, the light passes through the optical structures on the first optical film to concentrate energy at the positions where the light is spectrally separated by the prisms, while maintaining shading. In this way, the first optical film maintains its shading capability while still directing light towards concentrated emission points. Finally, the second optical films concentrate and focus the spectrally separated energy to enhance the light concentration and brightness of the backlight module.

DETAILED DESCRIPTION OF THE INVENTION

The detailed description and preferred embodiments of the invention will be set forth in the following content and provided for people skilled in the art to understand the characteristics of the invention.

The words "approximately", "approximately", "approximately" or "substantially" appearing in the content of this case not only cover the clearly stated numerical values and numerical ranges, but also covers the allowable deviation range that can be understood by a person with ordinary knowledge in the technical field to which the invention belongs. The deviation range can be determined by the error generated during measurement, and this error is caused, for example, by limitations of the measurement system or process conditions. In addition, "about" may mean within one or more standard deviations of the above numerical value, such as within ±10%, ±5%, ±3%, ±2%, ±1%, or ±0.5%. Words such as "about", "approximately" or "substantially" appearing in this text may be used to select acceptable deviation ranges or standard deviations based on optical properties, etching properties, mechanical properties, or other properties. Therefore, a single standard deviation is not applied to all the above optical properties, etching properties, mechanical properties, and other properties.

Figure 1:
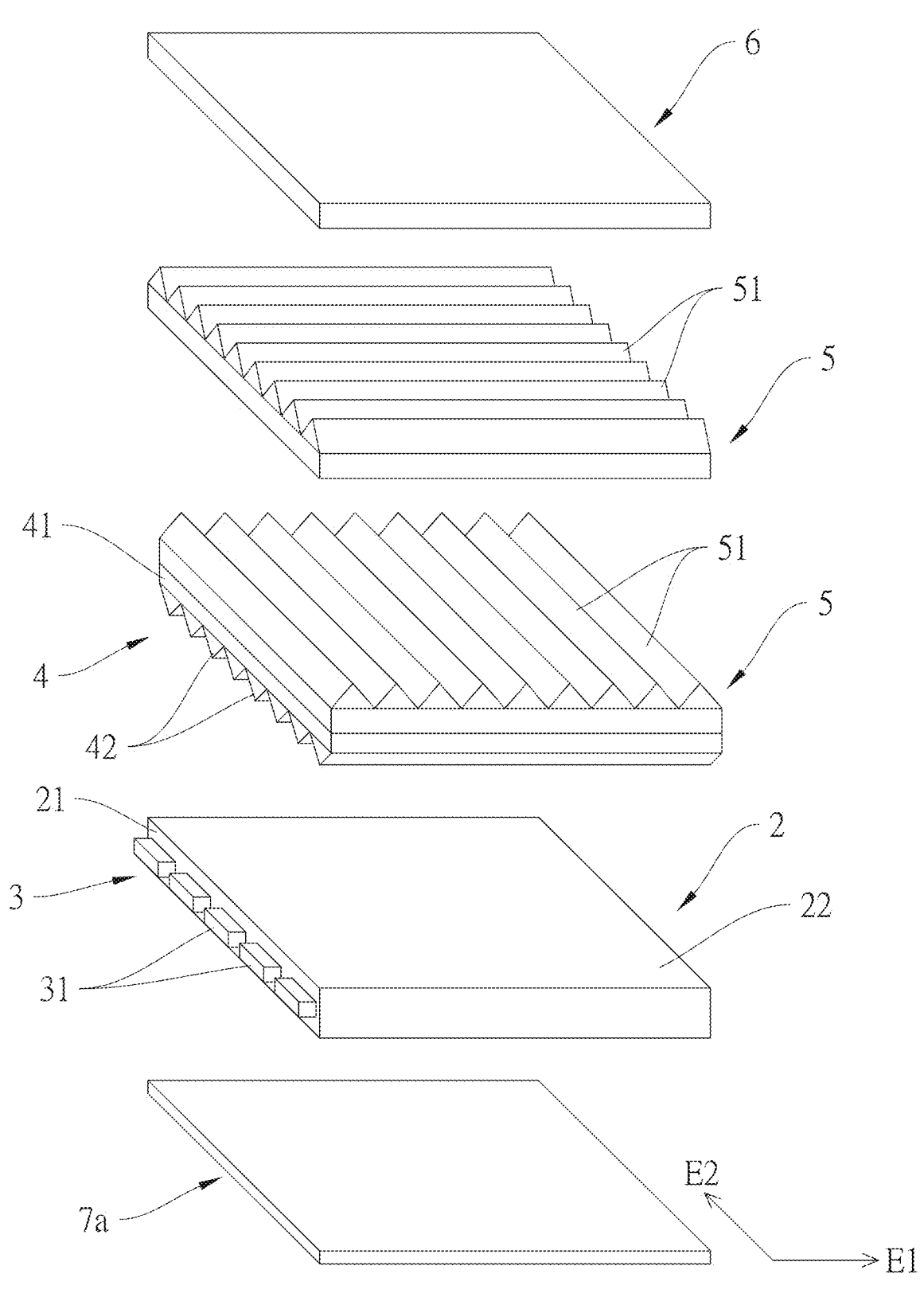
FIG. 1 is a three-dimensional exploded diagram illustrating a preferred embodiment of the backlight module of this present invention.
Figure 2:
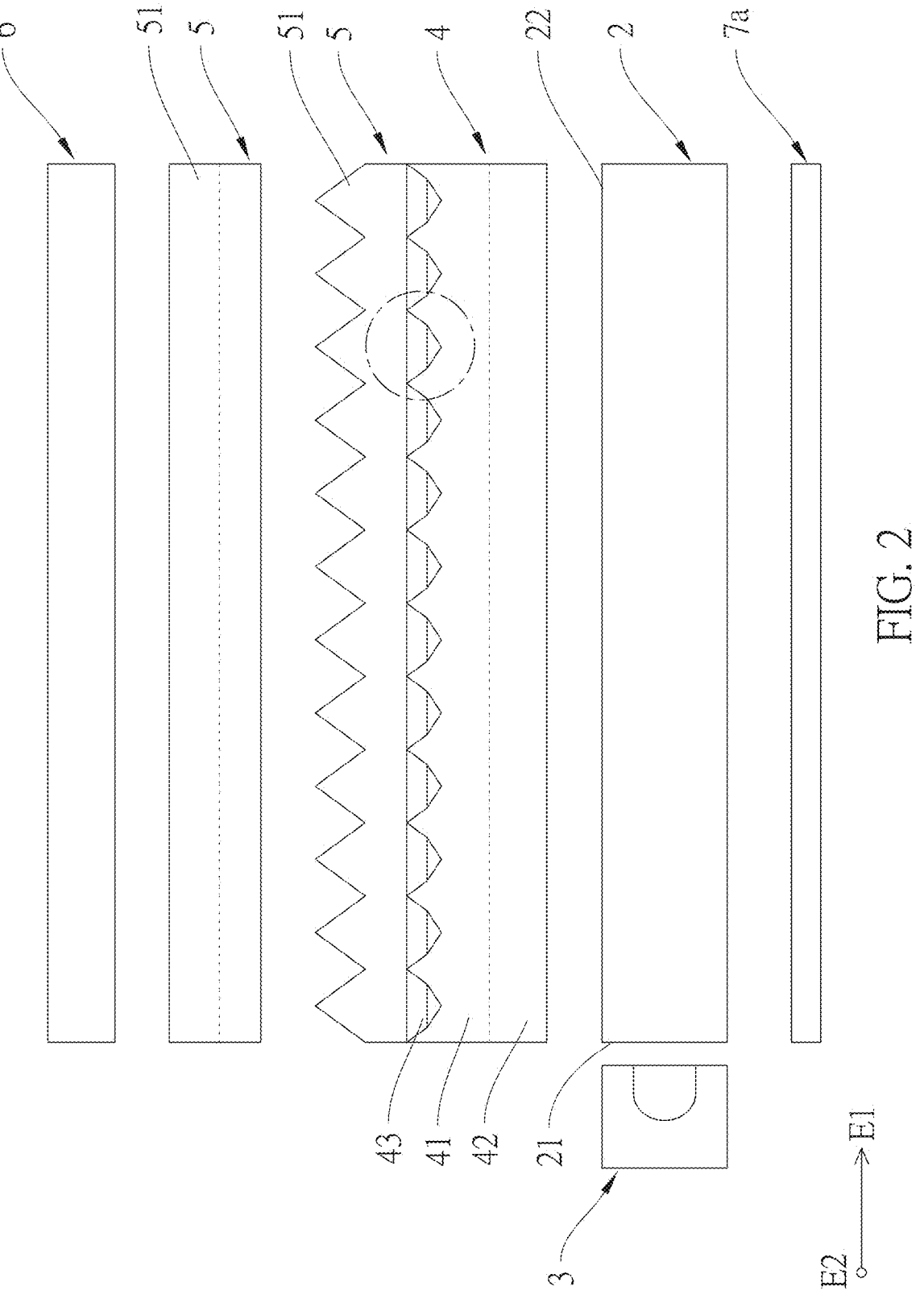
FIG. 2 is side-view diagram illustrating another angle of FIG. 1.

Referring to FIG. 1 and FIG. 2, it is a preferred embodiment of the backlight module of the present invention. The backlight module comprises a light guide plate 2, a light source 3, a first optical film 4, two second optical films 5, and a diffusion sheet 6. The light guide plate 2 includes a light incident surface 21 and a light emitting surface 22 connected to the light incident surface 21. The light source 3 is positioned corresponding to the light incident surface 21 of the light guide plate 2 and includes a plurality of light emitting elements 31 arranged along the light incident surface 21. The first optical film 4 is located between the second optical films 5 and the emitting surface 22. Each of the second optical films 5 is a prism film and is positioned between the diffusion sheet 6 and the first optical film 4 and stacking on top of the first optical film 4. In the first optical film 4 and the second optical films 5, at least two adjacent optical films form an integral structure. In the embodiments shown in FIG. 1 and FIG. 2, the first optical film 4 and the second optical film 5 adjacent to it form an integral structure.

The first optical film 4 is positioned corresponding to the light emitting surface 22 of the light guide plate 2, and includes a body 41, multiple prisms 42 arranged in parallel on the body 41 and facing towards the light emitting surface 22, and multiple optical structures 43 positioned on the body 41 and facing away from the light emitting surface 22. The prisms 42 are located between the light emitting surface 22 and the optical structures 43, and the direction E1 of the prisms 42 is parallel to the optical axis direction of the light emitting elements 31 of the light source 3. Each of the second optical films 5 has multiple parallel strips 51 facing away from the first optical film 4. The direction E1 of the strips 51 on one second optical film 5 is different from the direction E2 of the strips 51 on another second optical film 5. In the embodiment shown in FIG. 1, the strips 51 on the upper second optical film 5 extend along the direction E1, while the strips 51 on the lower second optical film 5 extend along the direction E2, where the direction E1 is perpendicular to the direction E2.

In this embodiment of the disclosed backlight module, the light emitted from the light source 3 first passes through the prisms 42 on the first optical film 4 to enhance directivity. However, there is a challenge with the difficulty in concentrating diffused energy. Subsequently, the light passes through the optical structures 43 on the first optical film 4 to maintain shading. In this way, the first optical film 4 maintains its shading capability while still directing light to concentrate emission. Finally, the second optical films 5 with strips 51 concentrate and focus the spectrally separated energy to enhance the light concentration efficiency and brightness of the backlight module. Furthermore, when at least two adjacent optical films form an integral structure, besides enhancing ease of assembly, it also prevents issues such as uneven light emission caused by adhesion between overlapping optical films.

In this embodiment, the first optical film 4 and the adjacent second optical film 51 are integrated structures. This design avoids adverse effects such as structural damage to the prisms 42 and optical structures 43 due to relative displacement between the optical films. In some embodiments, it can also be that two second optical films 5 form an integrated structure. In other embodiments, it can be that the first optical film 4 and the two second optical films 5 form a single integrated structure, ensuring that there are no relative positional offsets among them, which facilitates assembly. The optical films are typically bonded together after fabrication using an adhesive. The bonding method can be understood by those with ordinary skill in the art and will not be described again.

Figure 3:
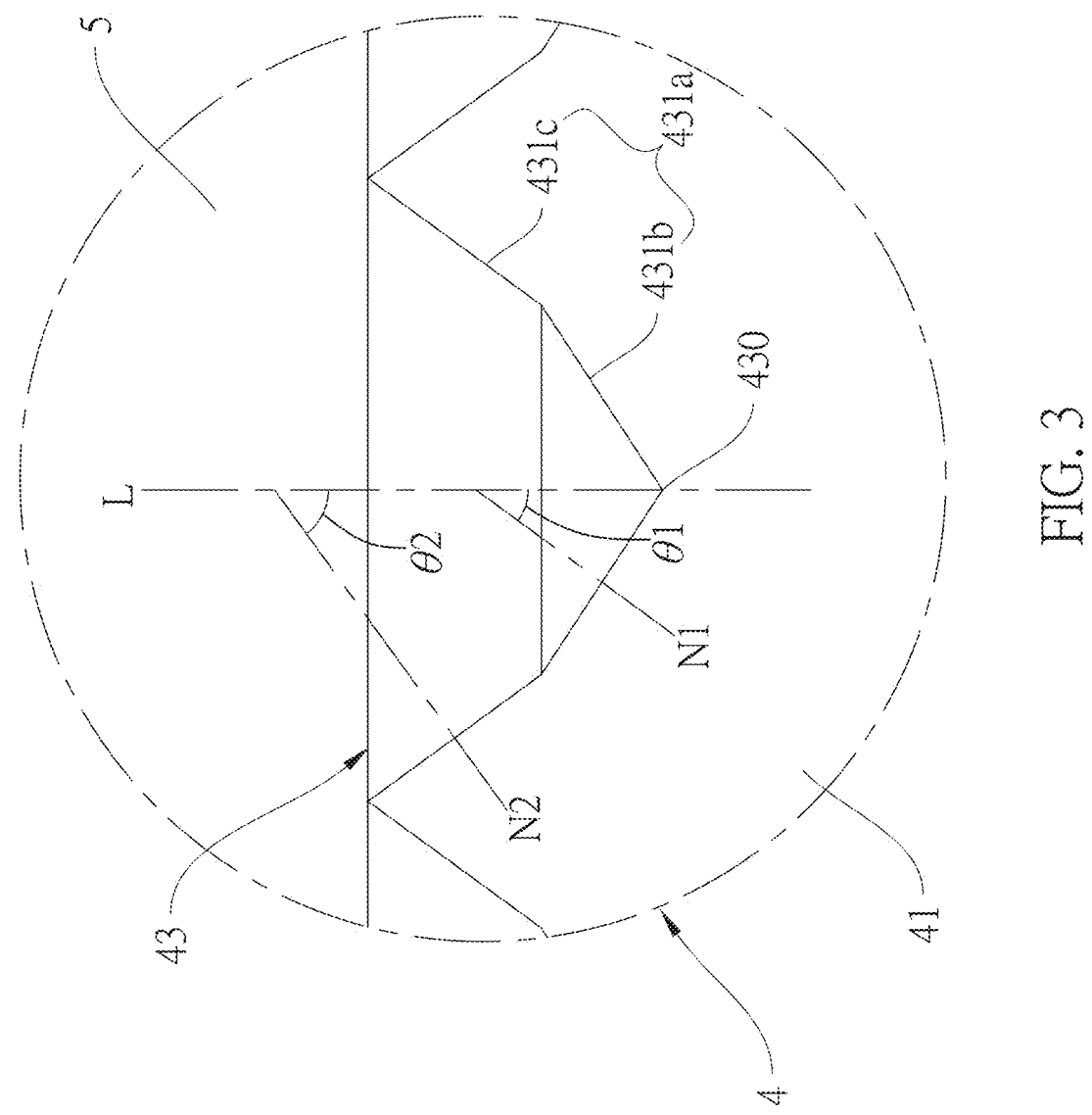
FIG. 3 is a schematic diagram showing an enlarged view of the boxed area in FIG. 2.

Referring to FIG. 2 and FIG. 3, next, we explain how the optical structures 43 of the first optical film 4 produce shading effects. Each optical structure 43 of the first optical film 4 has a central line L, a vertex 430 located on the central line L, and multiple side surfaces 431a surrounding the central line L. The light from the light source 3 enters the body 41 through the prisms 42 of the first optical film 4 and then exits the first optical film 4 through the optical structures 43 to maintain shading. The generation of shading effects primarily occurs because each said optical structure 43 has multiple side surfaces 431a, which deflect the light through these side surfaces 431a to guide it towards multiple emission directions. This prevents the light energy from concentrating excessively directly above the optical structures 43, thereby creating shading effects. Referring to FIG. 3, in this embodiment, the central line L of each optical structure 43 is perpendicular to the body 41 of the first optical film 4. Each optical structure 43 is pyramidal in shape, with four side surfaces 431a. Each side surface 431a has a composite surface formed by joining a first surface unit 431b and a second surface unit 431c along the direction of the central line L. Each surface unit has a normal line, and the angle between the normal line of the surface units within the same layer around the central line L is the same. However, the angle between the normal line of the surface units in different layers along the central line L varies. It should be noted that here "normal line" refers to the line perpendicular to each first surface unit 431b and second surface unit 431c, respectively. More specifically, each first layer facet unit 431b has a normal line N1, and each second layer facet unit 431c has a normal line N2. In each case, the angle $\theta1$ between the normal line N1 of each first surface unit 431b and the central line L is the same. Similarly, the angle $\theta2$ between the normal line N2 of each second layer facet unit 431c and the central line L is also the same. However, θ1 and θ2 are different from each other. In other words, the first surface units 431b and the second surface units 431c are sloped surfaces with different degrees of inclination. In some embodiments, the angle θ1 between the normal line N1 of the surface units closer to the vertex 430 and the central line L is smaller than the angle θ2 between the normal line N2 of the surface units farther from the vertex 430 and the central line L. This configuration creates surfaces with varying degrees of inclination. Thus, by utilizing surfaces with varying degrees of inclination, light is refracted and reflected differently, allowing the light to disperse more evenly in all directions. This reduces the concentration of light at specific angles or directly above, ensuring that the emitted light has different propagation directions. This approach aims to achieve uniform light distribution and enhance brightness during emission. Additionally, in this embodiment, the angle θ1 of the first surface units 431b near the vertex 430 is smaller than the angle θ2 of the second surface units 431c farther from the vertex 430. In other words, the angle between the normal line of the surface units and the central line L decreases as the distance from the second optical film 5 increases. This design facilitates easier manufacturing processes with higher yield rates, reducing the risk of sharp vertices at the vertex 430 that could affect production yield. Additionally, if the optical structures 43 are designed with concave structures, this can further reduce the thickness of the first optical film 4.

Figure 4:
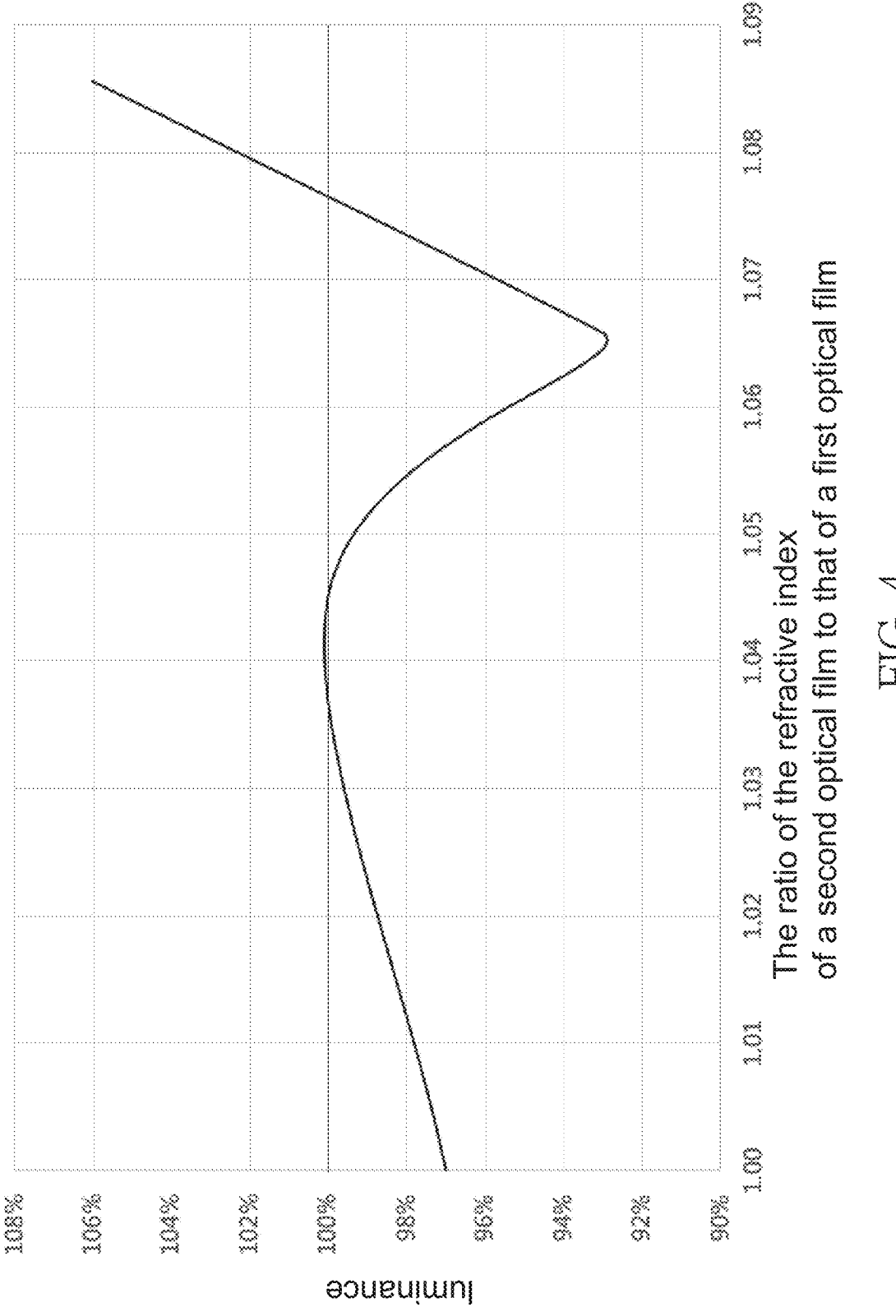
FIG. 4 is a curve diagram illustrating the relationship between luminance and the refractive index ratio of the second optical film to the first optical film.

Next, we further explain how the present invention enhances brightness through several methods. Firstly, let's set the luminance generated by the backlight module disclosed in FIG. 1 and FIG. 2 as 100%. In this embodiment, the ratio of the refractive index of the second optical film 5 to that of the first optical film 4 is greater than or equal to 1.08. As shown in FIG. 4, when the refractive index ratio is greater than or equal to 1.08, the luminance can be maintained at 100% or higher, and it steadily increases with an increase in the refractive index ratio. When the refractive index ratio is less than 1.08, the optical films with specific refractive index can be selected. For example, in certain embodiments, the refractive index of the second optical film 5 is 1.62, while the refractive index of the first optical film 4 is 1.55, and it can maintain the luminance around 100%. In such cases, the luminance remains at least at its original level without experiencing the decreases in luminance.

Figure 5:
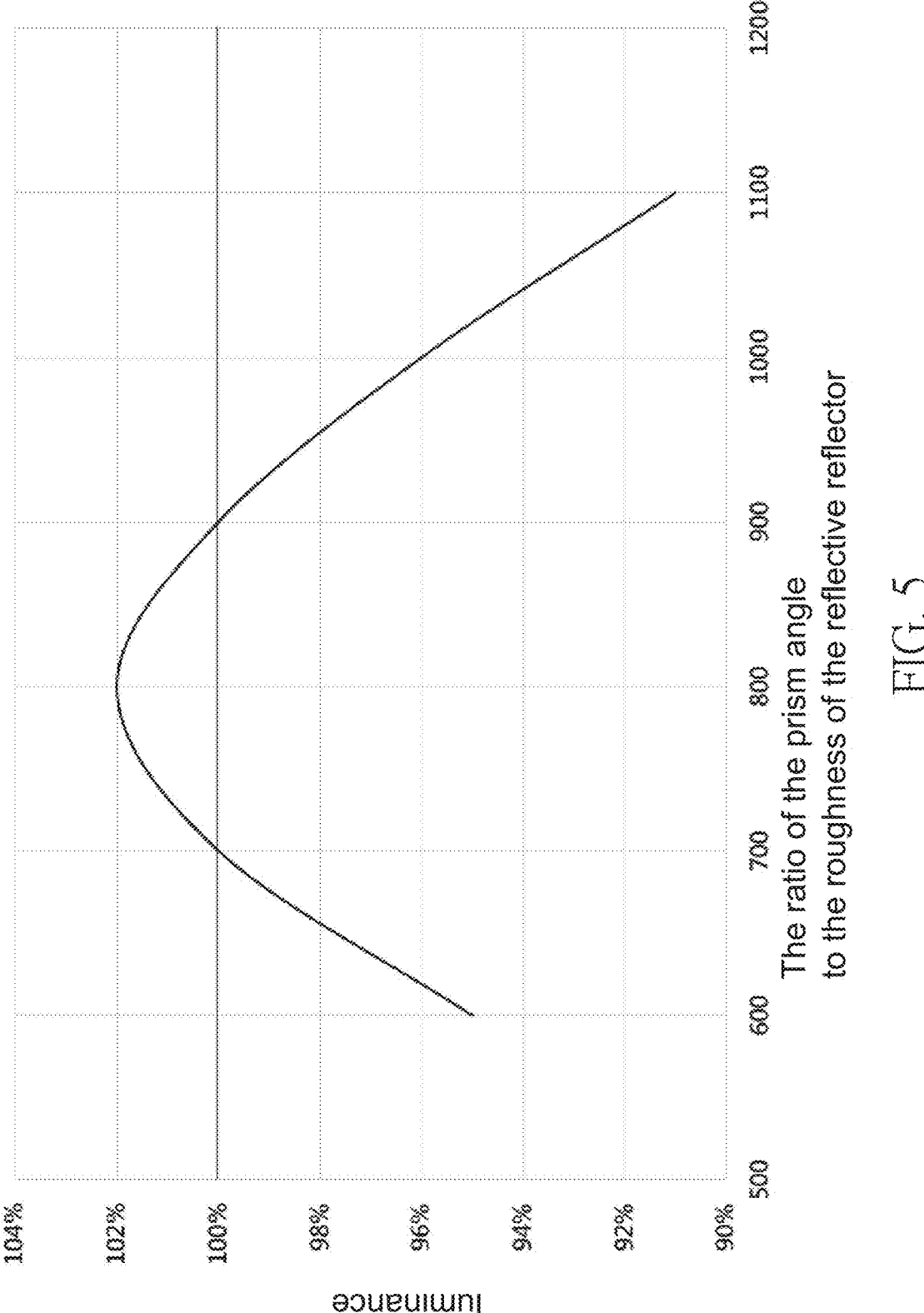
FIG. 5 is a curve diagram illustrating the relationship between luminance and the ratio of the prism angle of the first optical film to the roughness of the reflective reflector.

Referring to FIG. 1 and FIG. 2, the backlight module further includes a reflective reflector 7a located below the light guide plate 2. The ratio between the angle of the prisms 42 of the first optical film 4 and the roughness of the reflective reflector 7a ranges from 700 to 900, including the endpoint values. In this embodiment, the reflective reflector 7a is selected from a silver reflector with a roughness of 0.1. This type of reflector requires smaller angles for the prisms 42 of the first optical film 4. For example, the angle of each prism 42 ranges from 70° to 90°, including the endpoint values. Preferably, the angle for each prism 42 is 80°, which provides the optimal enhancement in luminance. The roughness refers to the centerline average surface roughness (Ra), which is defined as the arithmetic average of the absolute distances from the actual surface profile points to the centerline over a sampling length. The Ra is a common knowledge in the art and is not necessary to explain further. As shown in FIG. 5, the luminance generated by the backlight module disclosed in FIG. 1 and FIG. 2 is set as 100%. By maintaining the ratio between the angle of the prisms 42 and the roughness of the reflective reflector 7a between 700 and 900, the luminance can be maintained at 100% or higher.

Figure 6:
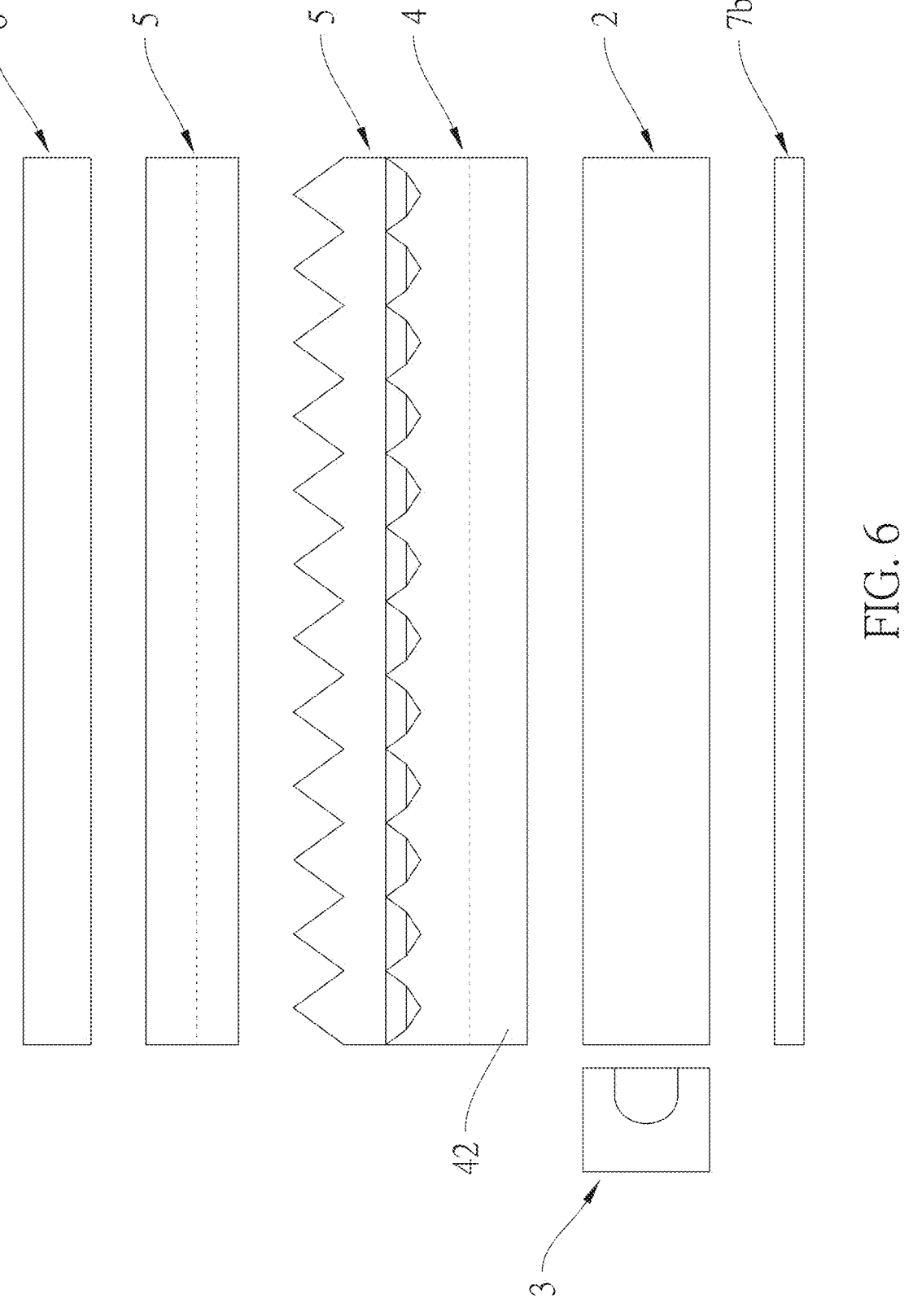
FIG. 6 is a side view diagram illustrating the use of different types of reflectors in the backlight module.
Figure 7:
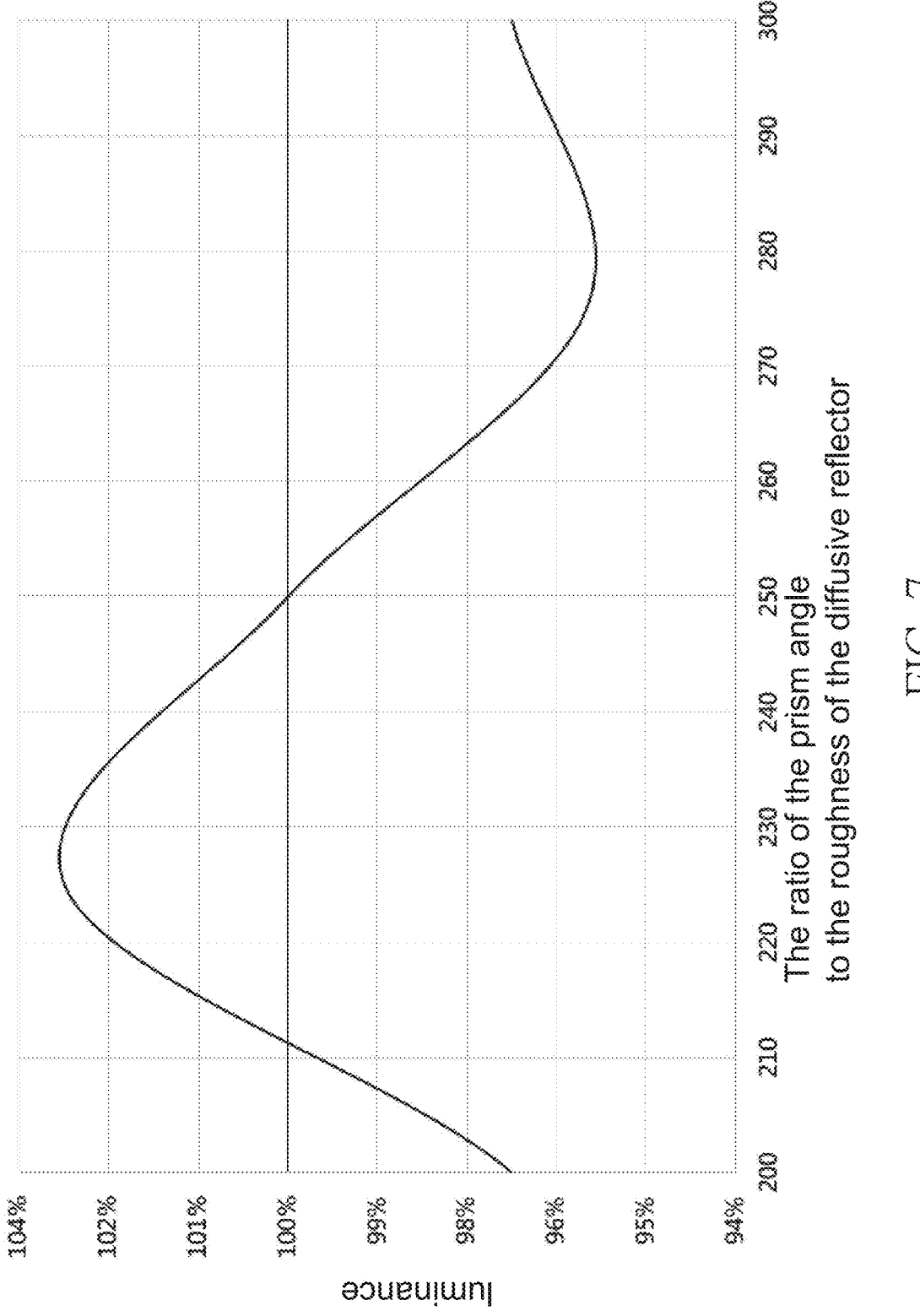
FIG. 7 is a curve diagram illustrating the relationship between luminance and the ratio of the prism angle of the first optical film to the roughness of the diffusive reflector.

In addition to the reflective reflector 7a, another option is to use a diffusive reflector. Referring to FIG. 6, in some embodiments, the backlight module further includes a diffusive reflector 7b located below the light guide plate 2. The ratio between the angle of the prisms 42 of the first optical film 4 and the roughness of the diffusive reflector 7b ranges from greater than 200 to equal to or less than 250. In this embodiment, the reflective reflector 7a selected is a matte white reflector with a roughness of 0.4. This type of reflector requires larger angles for the prisms 42 of the first optical film 4. For example, the angle of each prism 42 ranges from greater than 80° to equal to or less than 100°. Preferably, the angle for each prism 42 is 90°, which provides the optimal enhancement in luminance. As shown in FIG. 7, the luminance produced by the backlight module disclosed in FIG. 1 and FIG. 2 is set at 100%. By maintaining the ratio between the angle of prism 42 and the roughness of reflective reflector 7a between 200 and 250, the luminance can be maintained above 100%. Through this design, the optimal luminance can be maintained by selecting an appropriate reflector based on the angle of prism 42.

Figure 8:
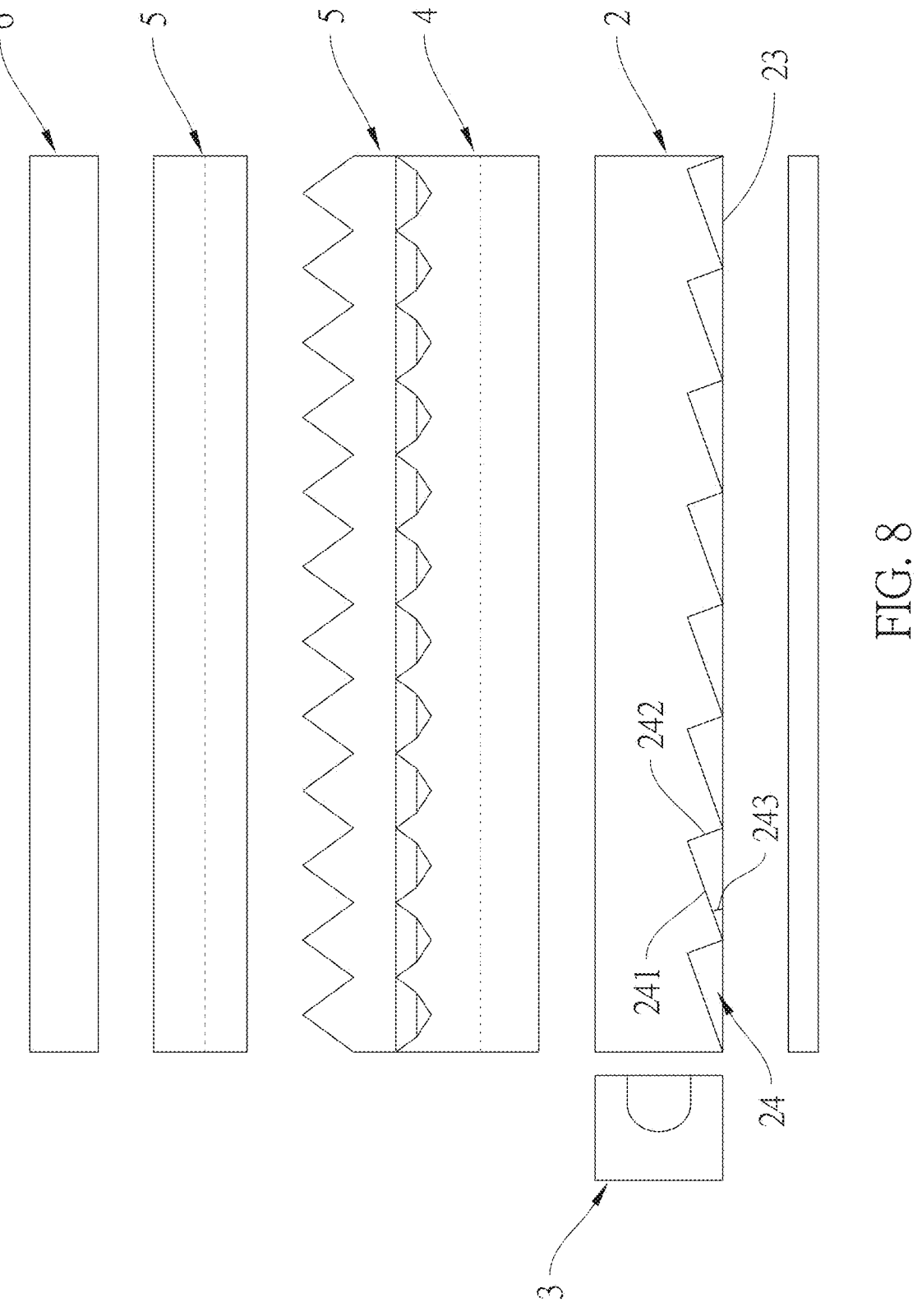
FIG. 8 is a side view diagram illustrating the formation of multiple light guide structures on the bottom surface of the light guide plate in the backlight module.
Figure 9:
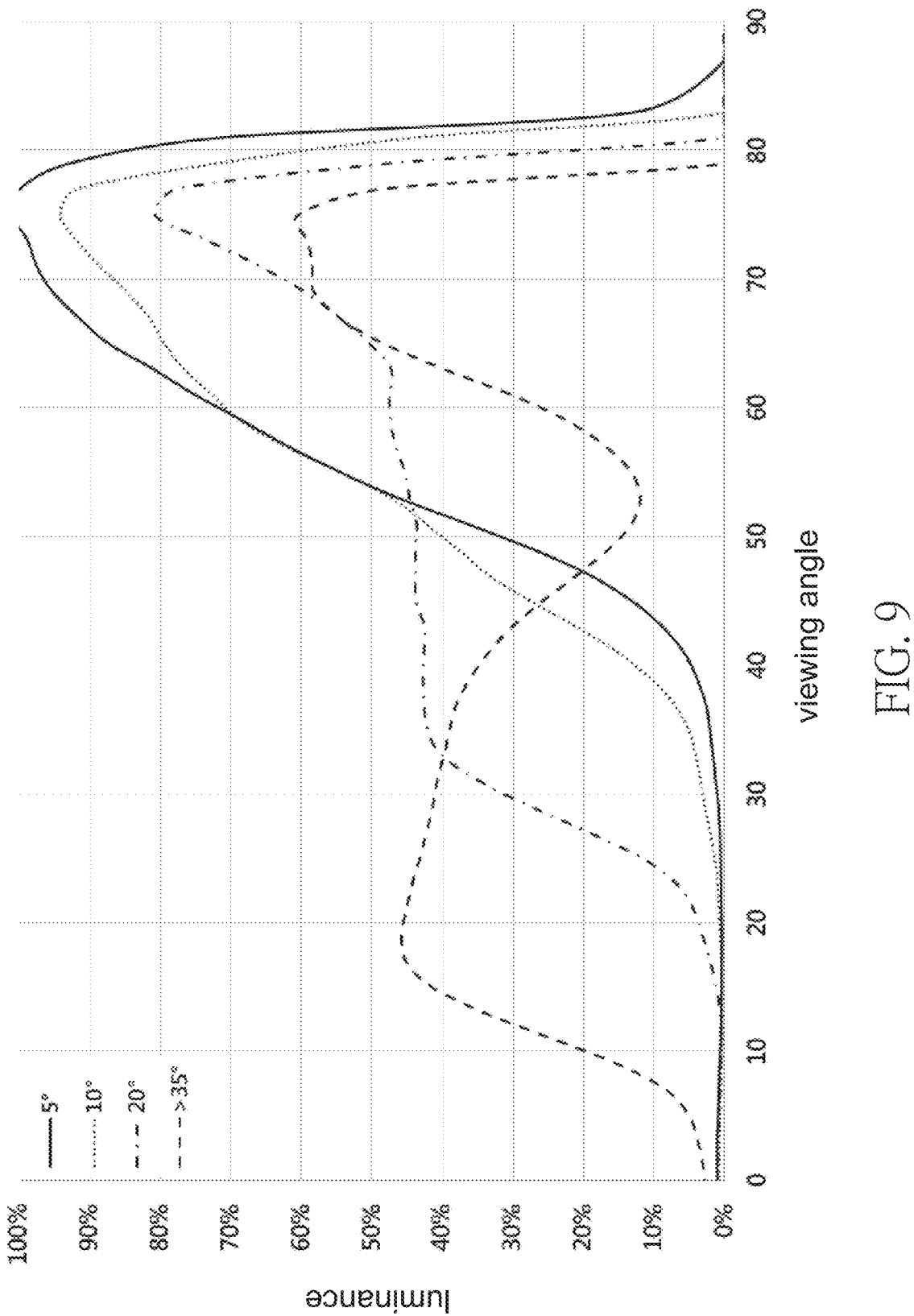
FIG. 9 is a curve diagram illustrating the relationship between luminance and the viewing angle of the light guide plate's light guide structures.
Figure 10:
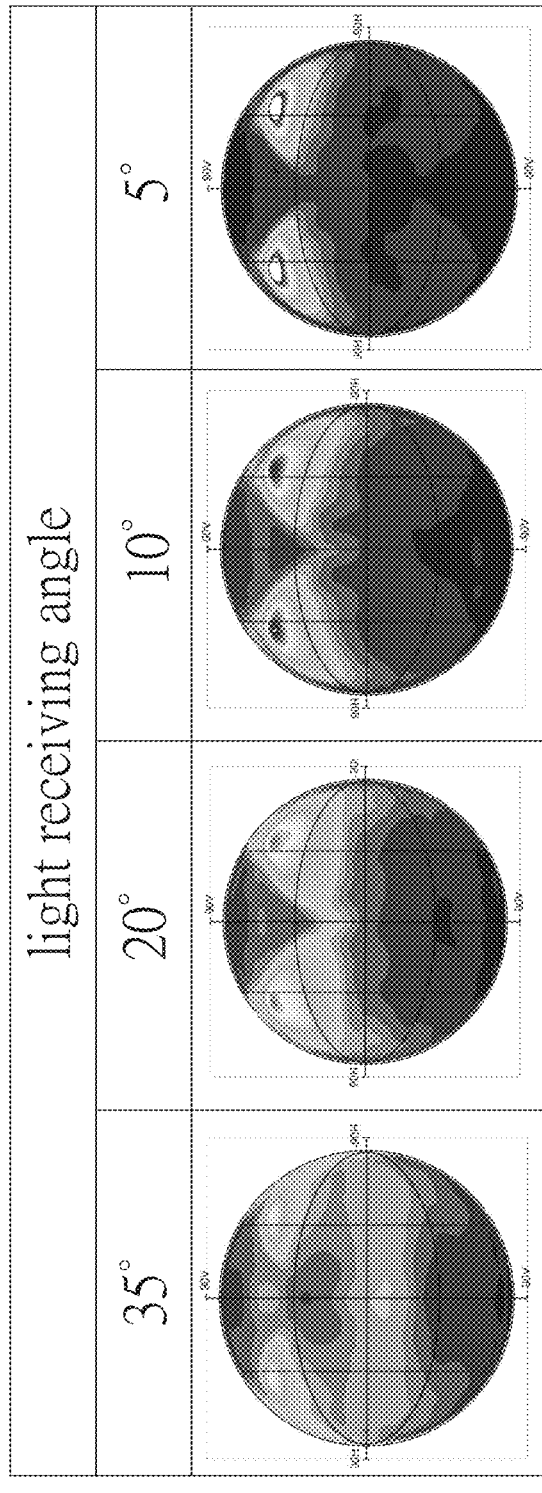
FIG. 10 is a simulated effect diagram illustrating the spatial luminance distribution of the backlight module according to different viewing angles.

In some embodiments as shown in FIG. 8, the light guide plate 2 further includes a bottom surface 23 opposite to the light emitting surface 22, and multiple light guide structures 24 formed on the bottom surface 23. Each of the light guide structures 24 has mutually connected a light receiving surface 241 and a non-light receiving surface 242. The light receiving surface 241 faces the direction of light propagation from the light source 3 and forms a light receiving angle 243 with the bottom surface 23 that is less than or equal to 20°. As shown in FIG. 9, when the light receiving angle 243 is set to 5°, the luminance generated by the backlight module is approximately 100%. When the light receiving angle 243 is less than or equal to 20°, it allows the light to concentrate within the viewing angle of 70° to 80°, with most of this range maintaining luminance above 60%. However, when the light receiving angle 243 exceeds 35°, regardless of the viewing angle, there is no concentration of light, and the luminance remains below 60%. It is insufficient to maintain good luminance, even within the viewing angle of 70° to 80°, where luminance still does not exceed 60%. As shown in FIG. 10, the spatial luminance distribution corresponding to the backlight module shown in FIG. 8. It's important to note that the spatial luminance distribution diagram is a computer simulation originally in color, presented here in grayscale. Additionally, both the vertical and horizontal axes in FIG. 10 represent angles, with the intersection of these axes representing the center axis of the light emitting surface 22 of the light guide plate 2. In general, the larger the light receiving angle 243, the more the light energy diverges, which is disadvantageous for luminance. Therefore, the present invention further limits the light receiving angle 243 to be less than or equal to 20° to enhance luminance. In FIG. 10, when the light receiving angle 243 is set at 20°, there is an energy concentration on both sides of the central axis. As the light receiving angle 243 decreases gradually, the energy concentration on both sides of the central axis becomes more pronounced, further enhancing the luminance. It is understood that the light guide structure 24 formed on the bottom surface 23 of the light guide plate 2 can effectively enhance brightness at specific angles with its light receiving angle 243. Conversely, if this light receiving angle gradually increases, such as to 35°, there will be a detrimental effect of a 10% reduction in brightness. In FIG. 10, it should be noted that the light guide structure 24 is designed in a concave shape. In certain embodiments, the light guide structure 24 can also be designed in a convex shape, achieving similarly effective brightness enhancement.

Figure 11:
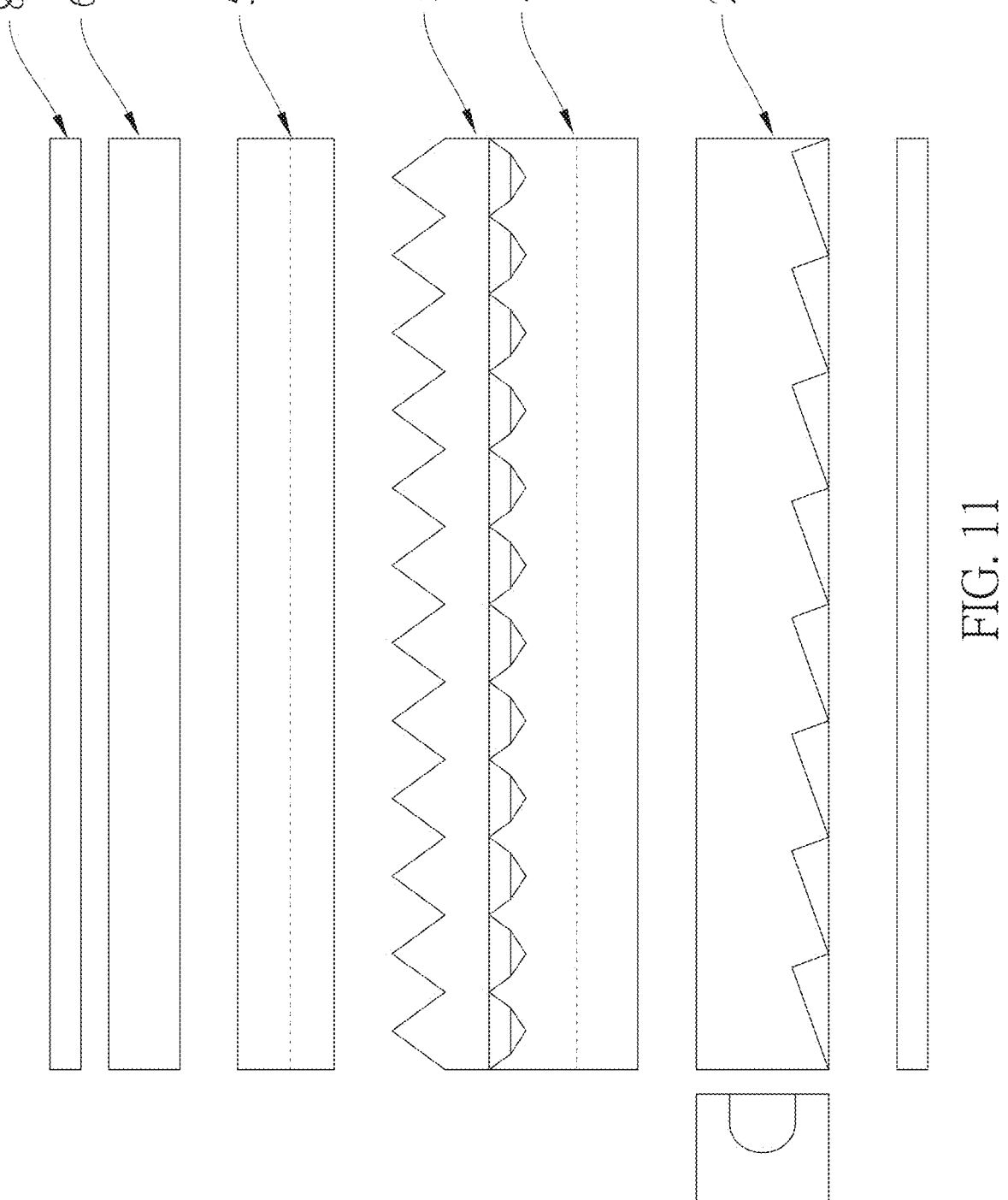
FIG. 11 is a side view diagram illustrating a preferred embodiment of the display device according to the present invention.

As shown in FIG. 11, a display panel 8 is disposed on the backlight module, thereby constituting a display device of the present invention. The display panel 8 can also be disposed on the backlight module as illustrated in FIG. 2 or FIG. 6.

Since the prisms 42 on the first optical film 4 and the strips 51 on one of the second optical films 5 are both linear structures, they are prone to interference patterns known as Moiré patterns due to their constant angle and frequency of occurrence. Moiré patterns are primarily visual effects where two or more sets of different patterns overlap or rotate, resulting in magnification or reduction. The principle behind Moiré patterns involves the interference of patterns with similar spatial frequencies, leading to the display of patterns with lower frequencies (wider spacing).

Figure 12:
FIG. 12 is a schematic diagram illustrating the formation mechanism of moiré patterns.
Figure 12:
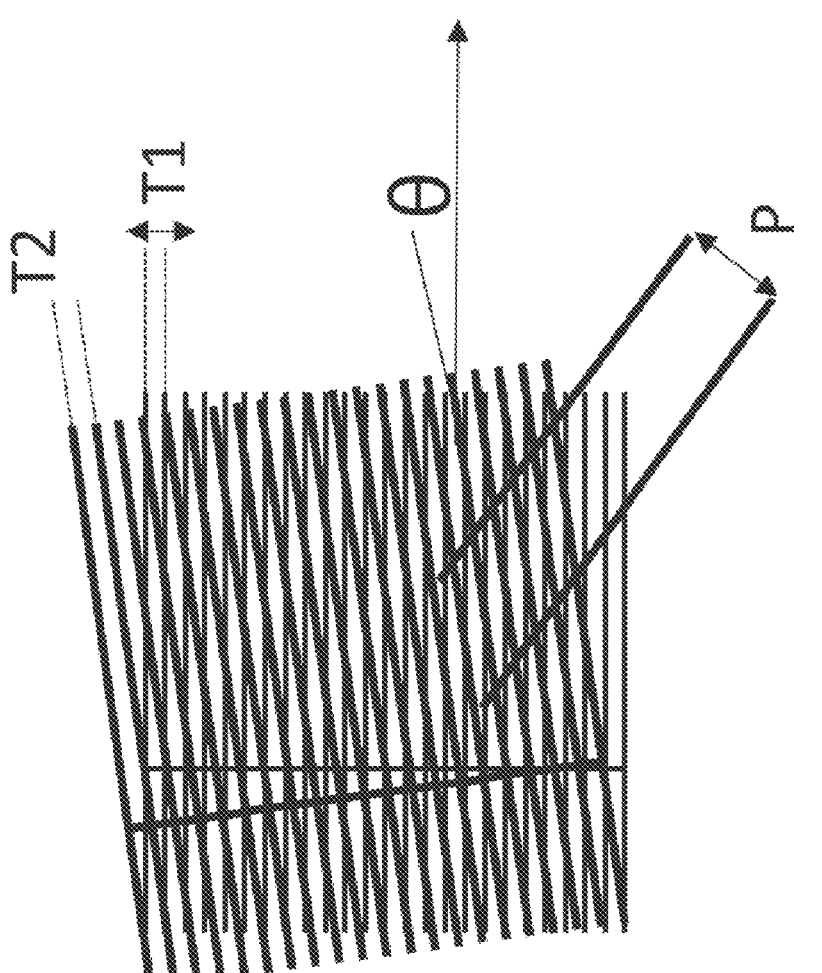
Figure 13:
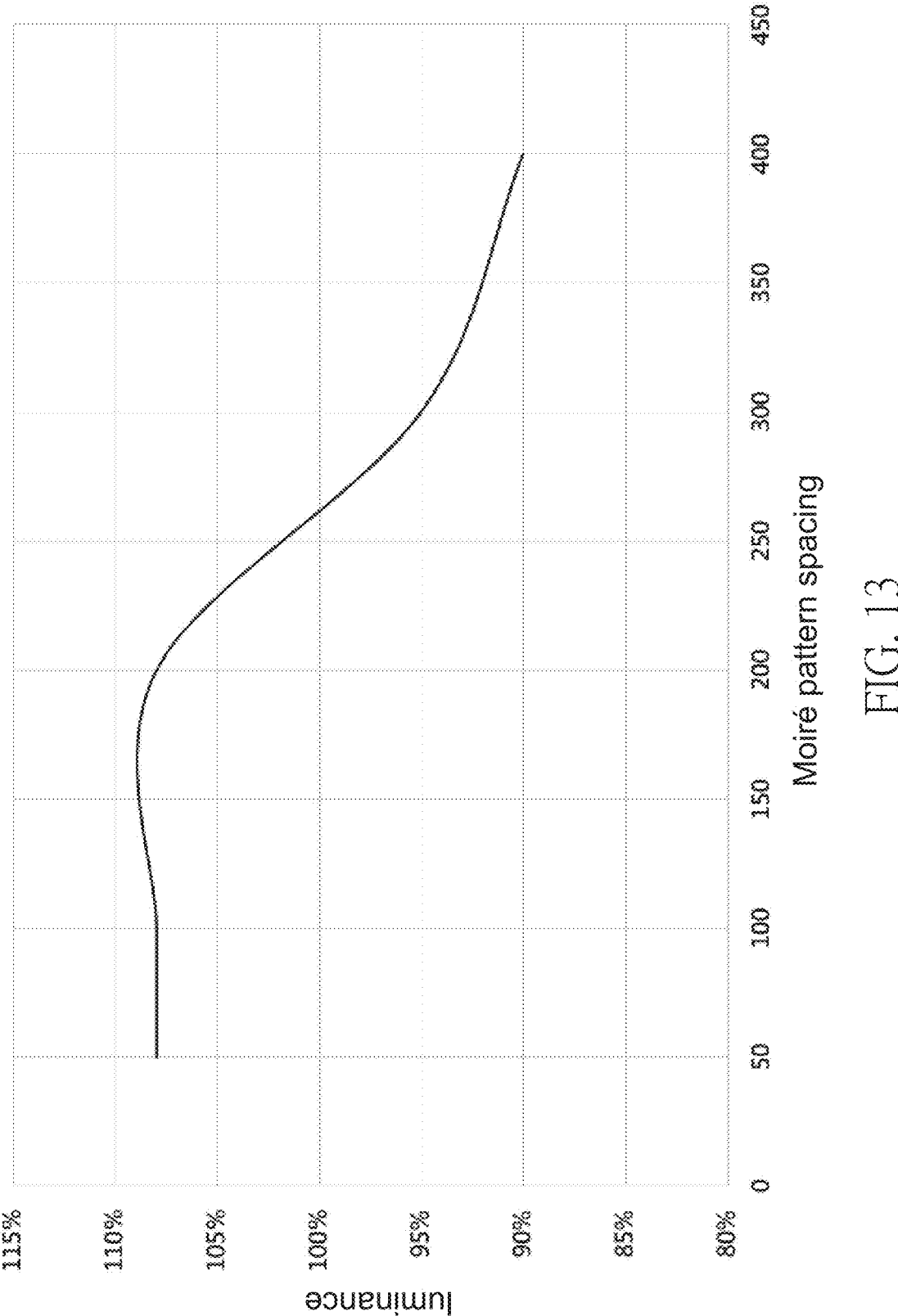
FIG. 13 is a curved diagram illustrating the relationship between spacing and luminance.

Referring to FIG. 12 and in conjunction with FIG. 2, in certain embodiments, there exists a non-zero angle θ between the prisms 42 of the first optical film 4 and the strips 51 on one of the second optical films 5. Each adjacent pair of prisms 42 has a prism spacing T1, and each adjacent pair of strips 51 has a strip spacing T2. These prisms 42 and strips 51 combine to produce multiple Moiré patterns. The spacing P between adjacent Moiré patterns satisfies the following relationship:

$$P = \frac{\sin\left[\tan^{-1}\left(\frac{T2 - T1\cos\theta}{T1\sin\theta}\right)\right] \times T1T2}{T2 - T1\cos\theta}.$$

Where the spacing P is less than 250 μm. As shown in FIG. 13, initially, the brightness produced by the backlight module disclosed in FIG. 1 and FIG. 2 is set at 100%. When the spacing P is less than 250 μm, it effectively enhances brightness, maintaining it at or above 100%.

Figure 14:
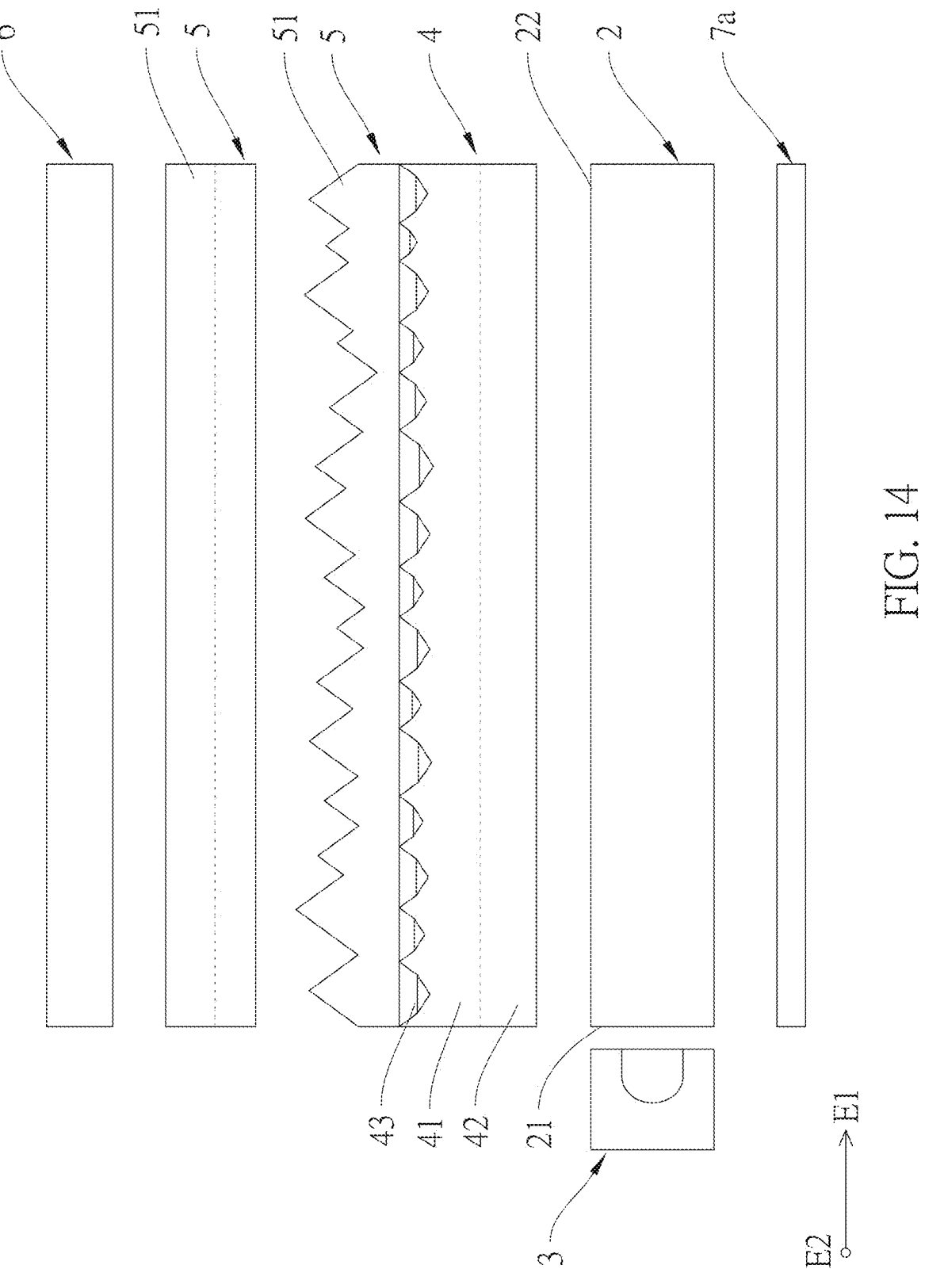
FIG. 14 is a side view diagram illustrating the random distribution of the depth of microstructures on the first optical film and the second optical film.

In addition, to prevent the occurrence of Moiré patterns, the present invention proposes several solutions. One of these solutions involves ensuring that the height of the prism structures on both the first optical film 4 and the second optical film 5 is randomly distributed. Referring to FIG. 14, as previously described, the first optical film 4 has prisms 42 and optical structures 43, while the second optical film 5 has strips 51. In this embodiment, the height of the prisms 42 on the first optical film 4, the height (or depth) of the optical structures 43, or the height of the strips 51 on the second optical film 5 is randomly distributed for at least one of them. Due to the viewing angle, FIG. 14 illustrates irregular random variations in the depth of the optical structures 43 on the first optical film 4 or the height of the strips 51 on the second optical film 5 adjacent to the first optical film 4. This approach disrupts the regular interference pattern between the prisms 42 and optical structures 43 on the first optical film 4, thereby mitigating Moiré pattern formation. Alternatively, randomizing the heights or depths of either the prisms 42, the optical structures 43, and the strips 51 on the second optical film 5, similarly reduces the risk of Moiré pattern occurrence.

Figure 15:
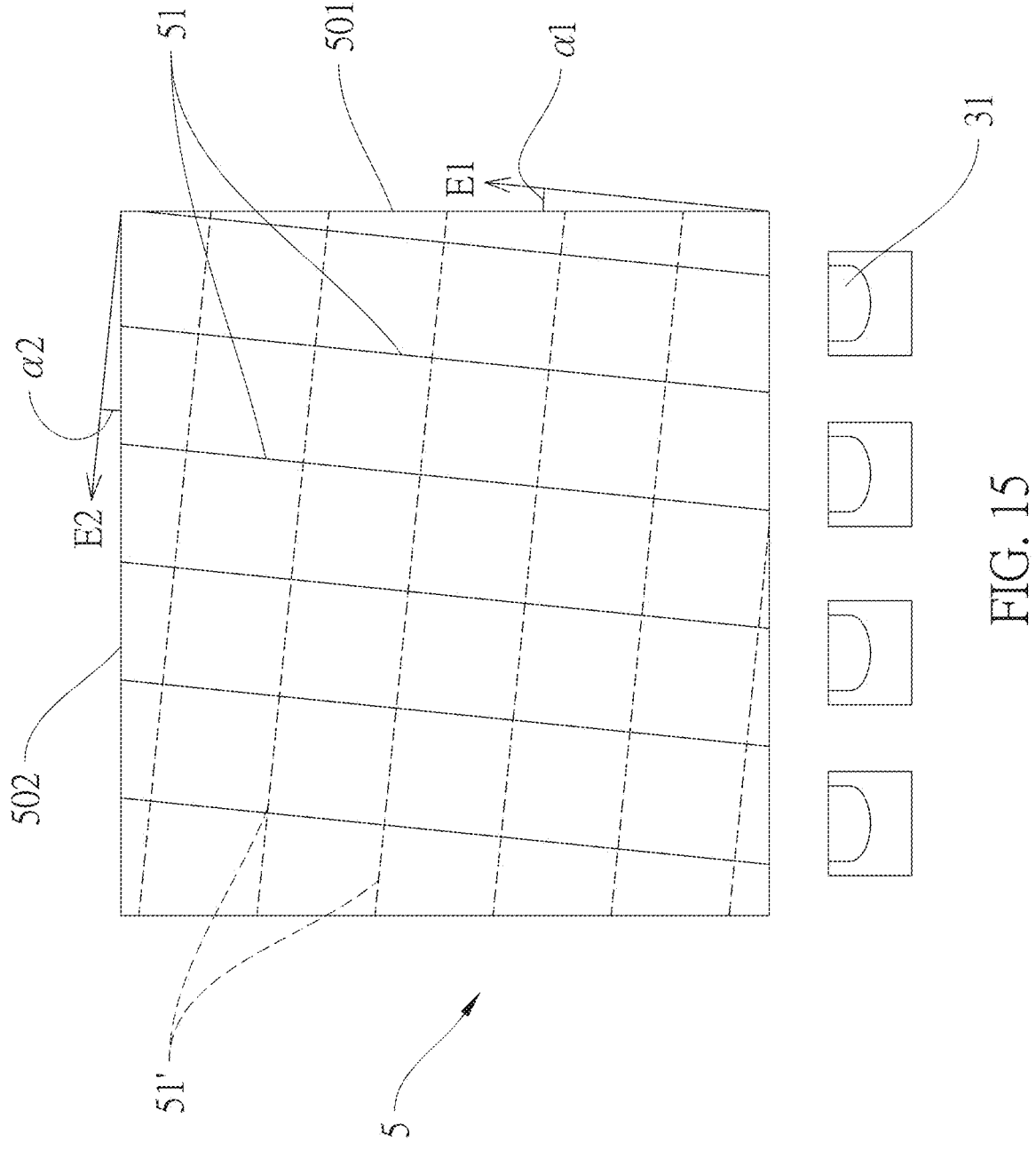
FIG. 15 is a top view diagram illustrating the deviation of strips on the two second optical films to reduce the occurrence of moiré patterns.

The second solution involves introducing slight deviations in the microstructures on each film or film itself. In the first method, as depicted in FIG. 15, each second optical film 5 has mutually perpendicular first edge 501 and second edge 502. Within these second optical films 5, the direction E1 of the strip 51 (solid line in FIG. 15) of one second optical film 5 forms a first angle α1 with the first edge 501, while the direction E2 of the strip 51' (dashed line in FIG. 15) of another second optical film 5 forms a second angle α2 with the second edge 502. In this embodiment, the directions E1 and E2 are substantially close to perpendicular. At least one of the first angle α1 or the second angle α2 is non-zero and ranges in absolute value from 3° to 5°, including endpoint values. By introducing these slight deviations in the directions of the strips 51 or strips 51' on the second optical film 5, it becomes less likely for them to interfere angularly with the prisms 42 and optical structures 43 on the first optical film 4, which are approximately parallel to the second optical films 5, thereby reducing the occurrence of Moiré patterns.

Figure 16:
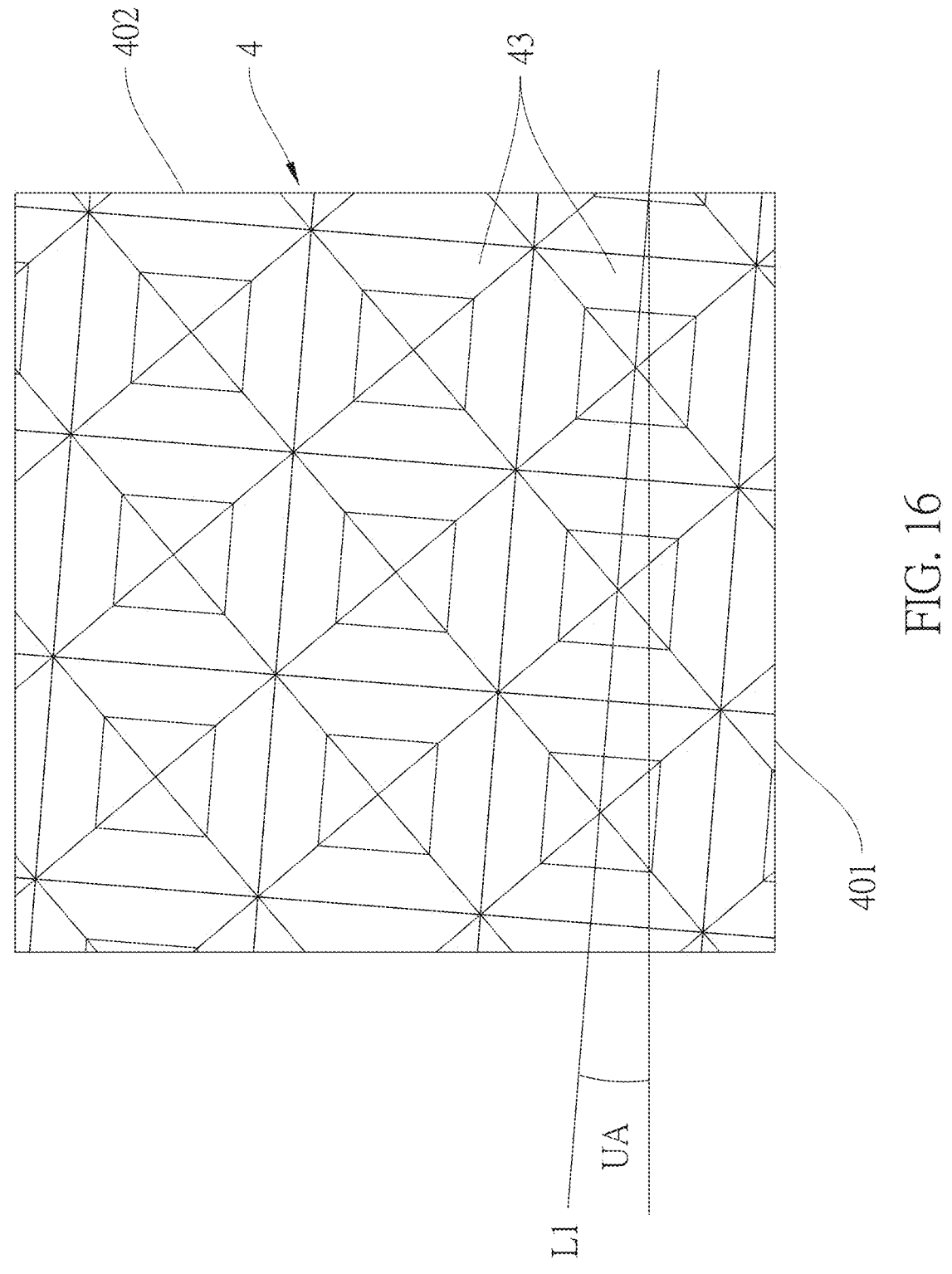
FIG. 16 is a top view diagram illustrating the deviation of optical structures on the first optical film to reduce the occurrence of moiré patterns.
Figure 17:
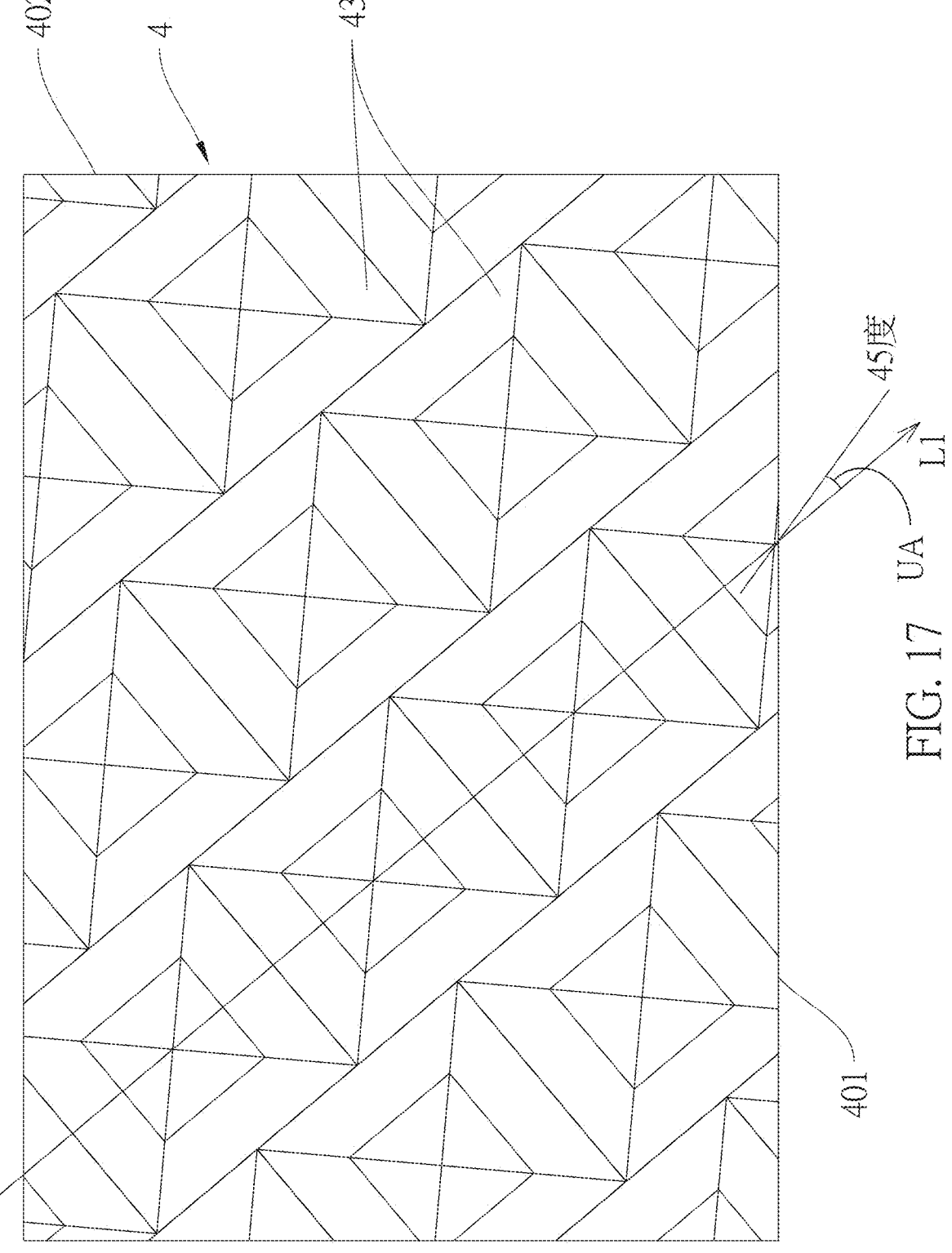
FIG. 17 is a top view diagram illustrating the deviation of optical structures on the first optical film to reduce the occurrence of moiré patterns, and the arrangement of the optical structures is different from FIG. 16.

In the second method, as shown in FIG. 16, the first optical film 4 has mutually perpendicular first side edge 401 and second side edge 402. The optical structures 43 on the first optical film 4 are arranged in an array such that the lines connecting the vertices of at least some optical structures 43, denoted as line L1, form an included angle denoted as an adjustment angle UA. Alternatively, as depicted in FIG. 17, line L1 is inclined at approximately a 45-degree angle and forms the adjustment angle UA. Wherein, the adjustment angle UA is non-zero and ranges in absolute value from 3° to 5°, including the endpoint values. By introducing these slight deviations in the alignment of the optical structures 43 on the first optical film 4, it becomes less likely for them to interfere angularly with the strips 51 or strips 51' on the second optical film 5, which are approximately parallel to the optical structures 43, thereby reducing the occurrence of Moiré patterns.

Figure 18:
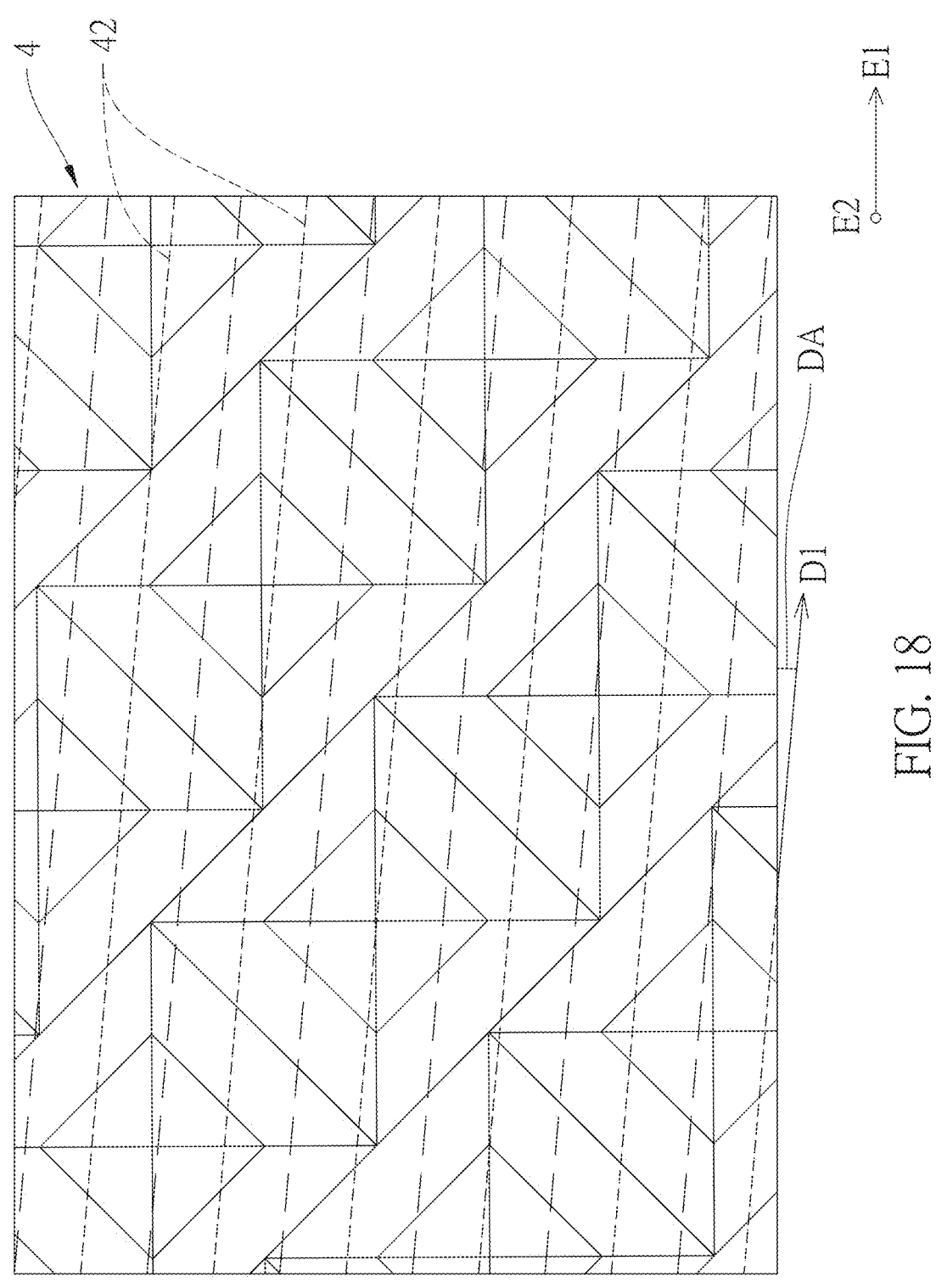
FIG. 18 is a top-view schematic diagram illustrating that the prisms on the first optical film deviate to reduce the moiré patterns.

In the third method, as seen in FIG. 18, the direction D1 of the prisms 42 on the first optical film 4 forms an included angle denoted as an adjustment angle DA relative to an edge parallel to the direction E1 of the first optical film 4. The adjustment angle DA is non-zero and ranges in absolute value from 3° to 5°, including of endpoint values. By introducing these slight deviations in the alignment of the prisms 42 on the first optical film 4, it becomes less likely for them to interfere angularly with the strips 51 or strips 51' on the second optical film 5, which are approximately parallel to the prisms 42, thereby reducing the occurrence of Moiré patterns.

In summary, whether employing the first solution of randomizing the height of the prism structures on the first optical film 4 and the second optical film 5, or adopting the second solution of introducing slight deviations in the microstructures on each film or film itself, both approaches aim to increase the variability in the angles at which light travels through the first optical film 4 and the second optical films 5. This variability helps to reduce interference phenomena and minimize the occurrence of Moiré patterns.

Figure 19:
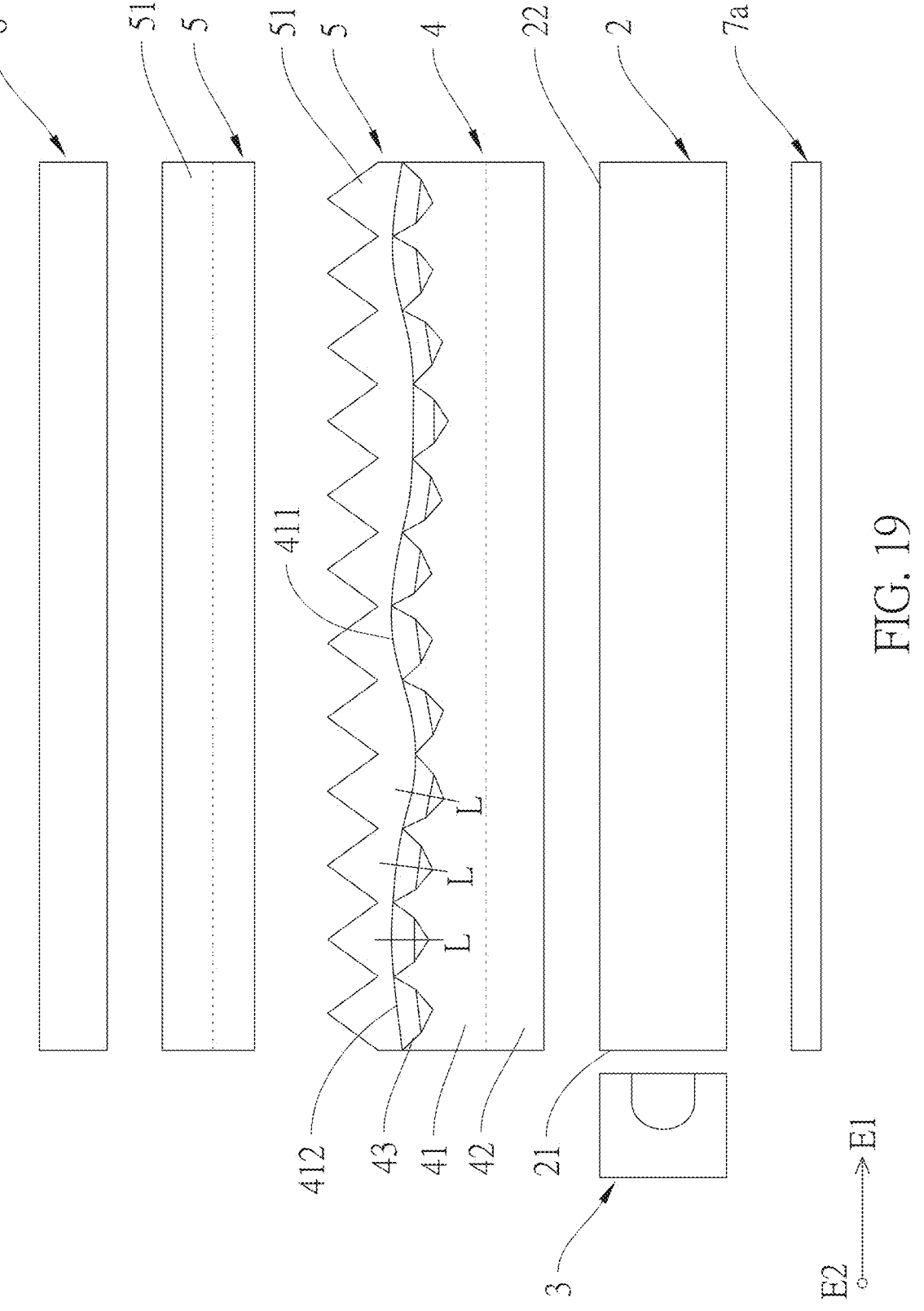
FIG. 19 is a side-view schematic diagram illustrating that the first surface of the first optical film has multiple upwardly curved regions, and each of which contains multiple optical structures.

Furthermore, to prevent optical films from adhering to each other when stacked, the present invention proposes another solution. Referring to FIG. 19, the body 41 of the first optical film 4 has a first surface 411 facing the light emitting surface 22 of the light guide plate 2, where the optical structures 43 are positioned. The first surface 411 features multiple upwardly curved regions 412, each containing multiple optical structures 43 whose central lines L are non-parallel to each other. The body 41 can be coated with a UV glue layer on a substrate layer, with the UV glue layer subsequently formed into upwardly curved regions before imprinting the shape of the optical structures 43 onto them. Once the UV glue layer is cured, each curved region 412 is formed with multiple optical structures 43. This design ensures that the first surface 411 of the first optical film 4 has protrusions rather than being completely flat, reducing the likelihood of contact and adhesion with the second optical film 5 positioned above it. This helps to avoid uneven light emission caused by mutual adhesion between the first optical film 4 and the second optical film 5, thereby maintaining uniform illumination.

The main purpose of the backlight module of the present invention is to enhance directional control of light emitted by the light source 3. This begins with the light passing through the prisms 42 on the first optical film 4, which improves directivity. Subsequently, the light passes through the optical structures 43 on the first optical film 4 to maintain masking effects. This configuration allows the first optical film 4 to maintain light masking capabilities while concentrating light emission. Finally, the second optical films 51 concentrate and focus the dispersed light energy, thereby enhancing the light emission control and light focusing characteristics and light directivity of the backlight module. Moreover, integrating at least two adjacent optical films into a single integral structure not only enhances assembly convenience but also prevents the occurrence of uneven light emission due to adhesion between stacked optical films. It also prevents relative displacement between optical films, which could adversely affect the optical structures. Additionally, combinations of different refractive indices among the optical films, the prism angles of the prisms 42 on the first optical film 4, combinations with different types of reflectors, the arrangement of light guiding structures 24 on the light guide plate 2, and specific spacing for Moiré pattern formation, all contribute to further increasing brightness and improving light uniformity of the backlight module while maintaining the masking effect. Furthermore, the prisms 42 of the first optical film 4, along with the optical structures 43, and the strips 51 of the second optical film 5, can all have their heights or depths randomly varied, or undergo slight deviations, to reduce the risk of Moiré pattern formation. Additionally, designing the first surface 411 of the first optical film 4 with protrusions rather than being completely flat helps reduce adhesion with the second optical film 5 positioned above it.

To sum up, the backlight module of the present invention can deflect light to one side and suppress the light emission rate of the other side through the combination of the optical film and the light control film, and it can be applied to environments that require anisotropic light fields.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, comprising:
   a light guide plate, including a light incident surface and a light emitting surface connected to the light incident surface;
   a light source, provided corresponding to the light incident surface of the light guide plate;
   a first optical film, provided corresponding to the light emitting surface of the light guide plate, the first optical film includes a body, a plurality of prisms arranged on the body and facing the light emitting surface, and a plurality of optical structures arranged on the body and facing away from the light emitting surface of the light guide plate, wherein, the prisms are located between the light emitting surface and the optical structures;
   two second optical films, stacked on the first optical film, each of the second optical films has a plurality of parallel strips facing away from the first optical film, and the direction E1 of the strips on one of the second optical films is different from the direction E2 of the strips on the other second optical film; and
   wherein the backlight module further includes a diffusive reflector located below the light guide plate, wherein the ratio between the prism angle of the prisms of the first optical film and the roughness of the diffusive reflector is greater than 200 and less than or equal to 250.

2. The backlight module as claimed in claim 1, wherein the two second optical films form an integrated structure.

3. The backlight module as claimed in claim 1, wherein the first optical film and the second optical film adjacent to the first optical film form an integrated structure.

4. The backlight module as claimed in claim 1, wherein the first optical film and the two second optical films form an integrated structure.

5. The backlight module as claimed in claim 1, wherein each of the optical structures has a central line and a vertex, the central line is perpendicular to the body of the first optical film, and the vertex is located on the central line.

6. The backlight module as claimed in claim 5, wherein each of the optical structures further has a plurality of side surfaces surrounding the central line, each of the side surfaces has two or more layers of surface units joined along the direction of the central line to form a composite surface, each of the surface units has a normal line, the angle between the central line and the normal line of the surface units of the same layer surrounding the central line is the same, and the angle between the central line and the normal line of the surface units of different layers along the central line is different.

7. The backlight module as claimed in claim 6, wherein the angle between the central line and the normal line of the surface unit closer to the vertex is smaller than the angle between the central line and the normal line of the surface unit farther away from the vertex.

8. The backlight module as claimed in claim 1, wherein the backlight module further includes a reflective reflector located under the light guide plate, and the ratio of the prism angle of the prisms of the first optical film to the roughness of the reflective reflector is between 700 and 900, including the endpoint values.

9. The backlight module as claimed in claim 8, wherein the angle of the prism of the first optical film ranges from 70° to 90°, including the endpoint values, and the roughness of the reflective sheet is 0.1.

10. The backlight module as claimed in claim 1, wherein the prism angle of the prisms on the first optical film is greater than 80° and less than or equal to 100°, and the roughness of the diffusive reflector is 0.4.

11. The backlight module as claimed in claim 1, wherein the ratio of the refractive index of the second optical film to the refractive index of the first optical film is greater than or equal to 1.08.

12. The backlight module as claimed in claim 1, wherein the refractive index of the second optical film is 1.62, and the refractive index of the first optical film is 1.55.

13. The backlight module as claimed in claim 1, wherein there is a non-zero angle θ between these prisms of the first optical film and the strips on one of the second optical films, the distance between adjacent prisms is denoted as T1, and the distance between adjacent strips is denoted as T2, the prisms and strips combine to form multiple moiré patterns, with each adjacent moiré pattern having a spacing denoted as P, and the spacing P must satisfy the following relationship:

$$P = \frac{\sin\left[\tan^{-1}\left(\frac{T2 - T1\cos\theta}{T1\sin\theta}\right)\right] \times T1T2}{T2 - T1\cos\theta}$$

wherein, the spacing P is less than 250 μm.

14. The backlight module as claimed in claim 1, wherein the light guide plate further includes a bottom surface opposite to the light emitting surface, and a plurality of light guide structures formed on the bottom surface, each of the light guide structure has a light receiving surface and a non-light receiving surface connected to each other, the light receiving surface faces the direction of light propagation from the light source, a light receiving angle is formed between the light receiving surface and the bottom surface, and the light receiving angle is less than or equal to 20°.

15. The backlight module as claimed in claim 5, wherein the body of the first optical film has a first surface facing away from the light emitting surface of the light guide plate, and the optical structures are disposed on the first surface, the first surface has a plurality of upwardly curved regions, and each of the curved regions contains several said optical structures.

16. The backlight module as claimed in claim 15, wherein the central lines of the optical structures within each curved region are not parallel to each other.

17. The backlight module as claimed in claim 1, wherein at least one of the height of the prisms of the first optical film, the height of the optical structures, and the height of the strips of the second optical film is randomly distributed.

18. The backlight module as claimed in claim 1, wherein each of the second optical films has mutually perpendicular first and second edges, in one of these second optical films, the direction E1 of the prism forms a first angle α1 with the first edge, and in the other second optical film, the direction E2 of the prism forms a second angle α2 with the second edge.

19. The backlight module as claimed in claim 18, wherein at least one of the first angle α1 and the second angle α2 is non-zero, and its absolute value is between 3° and 5°, including the endpoint value.

20. The backlight module as claimed in claim 5, wherein the first optical film has mutually perpendicular first and second side edges, the optical structures on the first optical film are arranged in an array such that for at least some of the optical structures, the line L1 connecting the vertices of these optical structures forms an angle with the first side edge of the first optical film that includes an upward adjustment angle UA, or the line L1 is tilted at approximately a 45-degree angle and includes the upward adjustment angle UA, the upward adjustment angle UA is non-zero, and its absolute value is between 3° and 5°, including the endpoint value.

21. The backlight module as claimed in claim 1, wherein the direction D1 of the prisms on the first optical film forms a downward adjustment angle DA with one edge that is parallel to the direction E1 on the first optical film, the downward adjustment angle DA is non-zero, and its absolute value is between 3° and 5°, including the endpoint value.

22. A display device, comprising the backlight module as described in claim 1, and a display panel arranged on the backlight module.

* * * * *